United States Patent
Araki et al.

(10) Patent No.: US 11,435,988 B2
(45) Date of Patent: Sep. 6, 2022

(54) CONVERSION APPARATUS, CONVERSION METHOD AND PROGRAM

(71) Applicant: NEC Corporation, Tokyo (JP)

(72) Inventors: Toshinori Araki, Tokyo (JP); Hikaru Tsuchida, Tokyo (JP); Kazuma Ohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/276,200

(22) PCT Filed: Sep. 20, 2018

(86) PCT No.: PCT/JP2018/034722
§ 371 (c)(1),
(2) Date: Mar. 15, 2021

(87) PCT Pub. No.: WO2020/059063
PCT Pub. Date: Mar. 26, 2020

(65) Prior Publication Data
US 2022/0035608 A1    Feb. 3, 2022

(51) Int. Cl.
*G06F 8/41* (2018.01)
*G06F 8/51* (2018.01)
*G06F 21/62* (2013.01)

(52) U.S. Cl.
CPC .......... *G06F 8/44* (2013.01); *G06F 8/51* (2013.01); *G06F 21/6245* (2013.01)

(58) Field of Classification Search
CPC .......... G06F 8/44; G06F 8/51; G06F 21/6245
See application file for complete search history.

(56) References Cited

U.S. PATENT DOCUMENTS

| | | | |
|---|---|---|---|
| 10,218,495 B2* | 2/2019 | Miyata | H04L 9/3226 |
| 10,423,806 B2* | 9/2019 | Cerezo Sanchez | G06F 40/18 |
| 2007/0118737 A1 | 5/2007 | Shimizu | |
| 2008/0083031 A1* | 4/2008 | Meijer | G06F 21/629 726/22 |
| 2008/0104699 A1* | 5/2008 | Gounares | G06F 9/468 726/25 |

(Continued)

FOREIGN PATENT DOCUMENTS

| | | |
|---|---|---|
| JP | 2007-128470 A | 5/2007 |
| JP | 2008-250931 A | 10/2008 |
| JP | 2009-060496 A | 3/2009 |
| JP | 2010-045670 A | 2/2010 |
| JP | 2017-111749 A | 6/2017 |

(Continued)

OTHER PUBLICATIONS

Zhang, Yihua, Aaron Steele, and Marina Blanton. "PICCO: a general-purpose compiler for private distributed computation." Proceedings of the 2013 ACM SIGSAC conference on Computers & communications security. 2013. (Year: 2013).*

(Continued)

*Primary Examiner* — Matthew J Brophy

(57) ABSTRACT

There is provided a conversion apparatus with which a secure computation execution environment may be easily constructed. The conversion apparatus comprises an input part and a conversion part. The input part inputs a source code. The conversion part converts the input source code so that a secure computation compiler processes it based on setting information relating to secret computation executed by a plurality of secure computation servers.

19 Claims, 13 Drawing Sheets

(56) References Cited

U.S. PATENT DOCUMENTS

| | | | | |
|---|---|---|---|---|
| 2014/0143764 A1* | 5/2014 | Kerschbaum | ............. | G06F 8/42 717/143 |
| 2016/0330018 A1* | 11/2016 | Miyata | ................. | H04L 9/3226 |
| 2018/0276417 A1* | 9/2018 | Cerezo Sanchez | ... | G06F 40/205 |
| 2020/0304293 A1* | 9/2020 | Gama | ..................... | G06F 17/16 |

FOREIGN PATENT DOCUMENTS

| | | |
|---|---|---|
| JP | 2018-045019 A | 3/2018 |
| WO | 2015/114947 A1 | 8/2015 |

OTHER PUBLICATIONS

Zhang, Yihua, Marina Blanton, and Ghada Almashaqbeh. "Implementing support for pointers to private data in a general-purpose secure multi-party compiler." ACM Transactions on Privacy and Security (TOPS) 21.2 (2017): 1-34. (Year: 2017).*

MacKenzie, Philip, Alina Oprea, and Michael K. Reiter. "Automatic generation of two-party computations." Proceedings of the 10th ACM conference on Computer and communications security. 2003. (Year: 2003).*

International Search Report for PCT Application No. PCT/JP2018/034722, dated Dec. 18, 2018.

"Scale-Mamba Software", Aug. 20, 2018, [online], [searched on Aug. 20, 2018], [internet]<URL: https://homes.esat.kuleuven.be/~nsmart/SCALE/>.

Yihua Zhang et al., "PICCO: A General-Purpose Compiler for Private Distributed Computation", The Proceedings of the 2013 ACM SIGSAC Conference on Computer and Communications Security(CCS'13), ACM, pp. 813-825, Nov. 4, 2013. Germany.

* cited by examiner

FIG. 6

```
1   /* main */
2   num_input = 1000
3   input_values = Array (num_input)
4   for i in range(num_input):
5       input_values[i]=get_input
6
7   result = mean(input_values, num_input)
8   print_ln('mean=%s'\n, result)
9
10  /* function */
11  def mean (value, num):
12      int sum
13      for i in range (num):
14          sum = sum + 10*value[i]
15      mean = sum/num
16      return mean
```

FIG. 7A

| | SETTING INFORMATION |
|---|---|
| DATA INPUT MODE | RECEPTION BY REPRESENTATIVE SEVER; REPRESENTATIVE SERVER = 10-1 |
| DATA RESTORATION SUBJECT | RESTORATION BY REPRESENTATIVE SERVER; REPRESENTATIVE SERVER = 10-1 |

FIG. 7B

| get_input | get_input_from() |
|---|---|
| ... | ... |

FIG. 7C

| print_ln(~, result) | print_ln(~, result.reveal()) |
|---|---|
| ... | ... |

FIG. 7D

| SECRET SHARING OF PARAMETERS | MINIMUM |
|---|---|

FIG. 7E

| TYPE NOT CLEARLY DESCRIBED | INTEGER TYPE |
|---|---|
| TYPE UPON DIVISION | FIXED POINT |

FIG. 8

```
1   /* main */
2   num_input = 1000
3   input_values = Array (num_input, sint)
4   for i in range(num_input):
5       input_values[i]=sint.get_input_from(1)
6
7   result = mean(input_values, num_input)
8   print_ln( 'mean=%s' \n, result.reveal(1))
9
10  /* function */
11  def mean (value, num):
12      sum=sint(0)
13      for i in range (num):
14          sum = sum + 10*value[i]
15
16      Sf=sfix(0)
17      Sf.load_int(sum)
18      Nf=sfix(0)
19      Nf.load_int(num)
20      mean = Sf/Nf
21      return mean
```

FIG. 9

```
1   /* main */
2   num_input = sint(1000)
3   input_values = Array (num_input, sint)
4   for i in range(num_input):
5       input_values[i]=sint.get_input_from(1)
6
7   result = mean(input_values, num_input)
8   print_ln('mean=%s' %n, result.reveal(1))
9
10  /* function */
11  def mean (value, num):
12      sum=sint(0)
13      p1=sint(10)
14      for i in range (num):
15          sum = sum + p1*value[i]
16
17      Sf=sfix(0)
18      Sf.load_int(sum)
19      Nf=sfix(0)
20      Nf.load_int(num)
21      mean = Sf/Nf
22      return mean
```

FIG. 12

| PARAMETERS, CONSTANT VALUE | NECESSITY FOR SECRET SHARING |
|---|---|
| sum | NECESSARY |
| num_input | UNNECESSARY |
| ... | ... |

CONVERSION APPARATUS, CONVERSION METHOD AND PROGRAM

This application is a National Stage Entry of PCT/JP2018/034722 filed on Sep. 20, 2018, the contents of all of which are incorporated herein by reference, in their entirety.

FIELD

The present invention relates to a conversion apparatus, a conversion method and a program.

BACKGROUND

There is a technology referred to as secure computation (Multi Party Computation; MPC) (for example, see Patent Literature 1). In the secure computation (secret sharing type computation), a plurality of parties (secure computation servers) execute various computation using confidential information while hiding the secret information respectively held by the parties.

Each secure computation server is mutually cooperated to execute a predetermined process. At that time, it is required to input a binary code (hereinafter, referred to as secure computation execution code) to each secure computation server so as to execute secure computation. The secure computation execution code is generated by inputting a source code to a secure computation compiler, for example, as disclosed in Non-Patent Literature 1. By execution of secure computation compiler, the secure computation execution code to be input (distributed) to each secure computation server may be obtained.

Patent Literature 1: JP Patent Publication No. 2018-045019A
Non-Patent Literature 1: "SCALE-MAMBA Software", Aug. 20, 2018, [online], [searched on Aug. 20, 2018], [internet]<URL: https://homes.esat.kuleuven.be/~nsmart/SCALE/>

SUMMARY

The disclosure of the above literatures of Citation List is to be incorporated herein by reference. The following analyses have been made by the present inventors.

As described above, generation of the secure computation execution code is required to execute secure computation. At that time, a secure computation compiler is used, however the source code that may be processed by the secure computation compiler is a source code created for secure computation (hereinafter, referred to as "secure computation specific code"). That is, the secure computation compiler cannot generate the secure computation execution code from a source code described in a general language, such as C language, Python and the like. Therefore, an expert familiar with secure computation generates the secure computation specific code by editing a source code described in a general language and the like. In other words, there is a situation where a technician who does not have expert's knowledge for secure computation is difficult to generate the secure computation specific code.

Herein, as represented by enforcement of General Data Protection Regulation (GDPR) in Europe, it becomes difficult that an operator provides personal information to a third party. On the other hand, there is an approach for providing a beneficial service by utilizing not only information held by oneself, but also information held by the other persons. For example, a service is under discussion, where information (name, disease history, gene information, etc.) held by different medical institutions are integrated and these information is analyzed so as to determine a gene and the like affecting a given disease.

However, it is difficult to provide a third party with information respectively held by each medical institution in such a form that the contents therein may be identified. Therefore, it is prospected to utilize secure computation as a technology for realizing an analysis of information held by each medical institution while keeping personal information in secret. Concretely, information used in above analysis process (personal information held by each medical institution) is distributed to each secure computation server while keeping it in secret. Each secure computation server uses information subjected to the secret sharing (share information) to execute a variety of statistical processing and output a statistical result.

As stated above, by virtue of utilizing secure computation, beneficial information may be elicited from information held by a plurality of medical institutions while keeping personal information held by each medical institution in secret.

As explained above, under a situation where protection of the personal information is further requested, it is prospected that development range, application range of secure computation would be increased. However, as described above, since expert's knowledge for secret computation is required to realize secure computation, thus there is a hindrance upon introducing the secure computation technology to a variety of systems.

It is a main purpose of the present invention to provide a conversion apparatus, a conversion method and a program that contribute to realize easy construction of a secure computation execution environment.

According to a first aspect of the present invention, there is provided a conversion apparatus, comprising an input part for inputting a source code, and a conversion part that converts the source code so that a secure computation compiler processes the source code based on setting information relating to secure computation executed by a plurality of secure computation servers.

According to a second aspect of the present invention, there is provided a conversion method, including inputting a source code, and converting the source code so that a secure computation compiler processes it based on setting information relating to secure computation executed by a plurality of secure computation servers.

According to a third aspect of the present invention, there is provided a program, causing a computer to execute a process of inputting a source code, and to execute a process of converting the source code so that a secure computation compiler processes it based on setting information relating to secure computation executed by a plurality of secure computation servers.

Herein, the program may be stored in a computer readable storage medium. The storage medium may be non-transient one, such as semiconductor memory, hard disk, magnetic recording medium, optical recording medium and like. The present invention may be realized as a computer program product.

According to each of aspects of the present invention, there are provided a conversion apparatus, a conversion method and a program, which contribute to realize easy construction of a secure computation execution environment.

BRIEF DESCRIPTION OF THE DRAWINGS

FIG. 6 is a diagram showing an example of a source code input by the code conversion apparatus of the first exemplary embodiment.

FIGS. 7A to 7E are a diagram showing an example of setting information referred by a conversion part of the first exemplary embodiment, respectively.

FIG. 8 is a diagram showing an example of a secure computation specific code.

FIG. 9 is a diagram showing an example of the secure computation specific code.

FIG. 12 is a diagram showing an example of a list for determining whether or not secret sharing for parameter and the like is required in a second exemplary embodiment.

MODES

First of all, an outline of one exemplary embodiment is explained. Herein, reference signs in this outline are expediently attached to each element as an explanatory aid for understanding, thus any limitations are not intended by the disclosure of this outline. In addition, connection lines between blocks in each figure include both of bidirectional connection and one directional connection. One way arrow schematically indicates a flow of a main signal (data), but not excluding bidirection. Further, although being omitted in a circuit diagram, block diagram, inner configuration diagram, connection diagram and like of the present disclosure, an input port and an output port are present respectively on an input end and an output end of each connection line. The same is applied to input/output interfaces.

Figure 1:
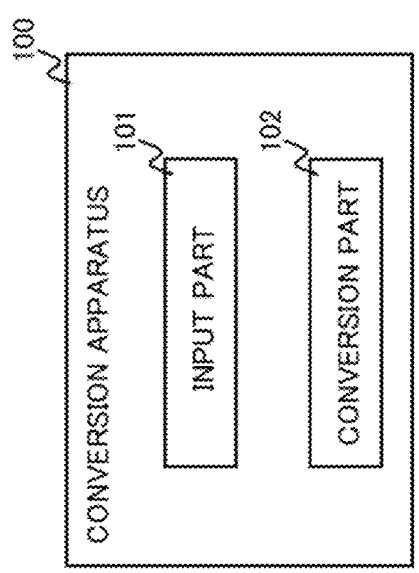
FIG. 1 is an explanatory view of an outline of one exemplary embodiment.

A conversion apparatus 100 of one exemplary embodiment comprises an input part 101 and a conversion part 102 (see FIG. 1). The input part 101 inputs (receives) a source code. The conversion part 102 converts the input source code so that a secure computation compiler may process it based on setting information relating to secure computation executed by a plurality of secure computation servers.

According to the conversion apparatus 100, a secure computation specific code may be obtained from a source code prepared by a user, which may be processed by a secure computation compiler. As a result, a secure computation execution environment may be easily constructed even by a user having no expert's knowledge for secure computation.

Concrete exemplary embodiments will be explained below in further detail while referring to drawings. Herein, the same reference numerals are affixed to the same component in each exemplary embodiment, thus explanation thereof is omitted.

First Exemplary Embodiment

A first exemplary embodiment will be explained in further detail using drawings.

Figure 2:
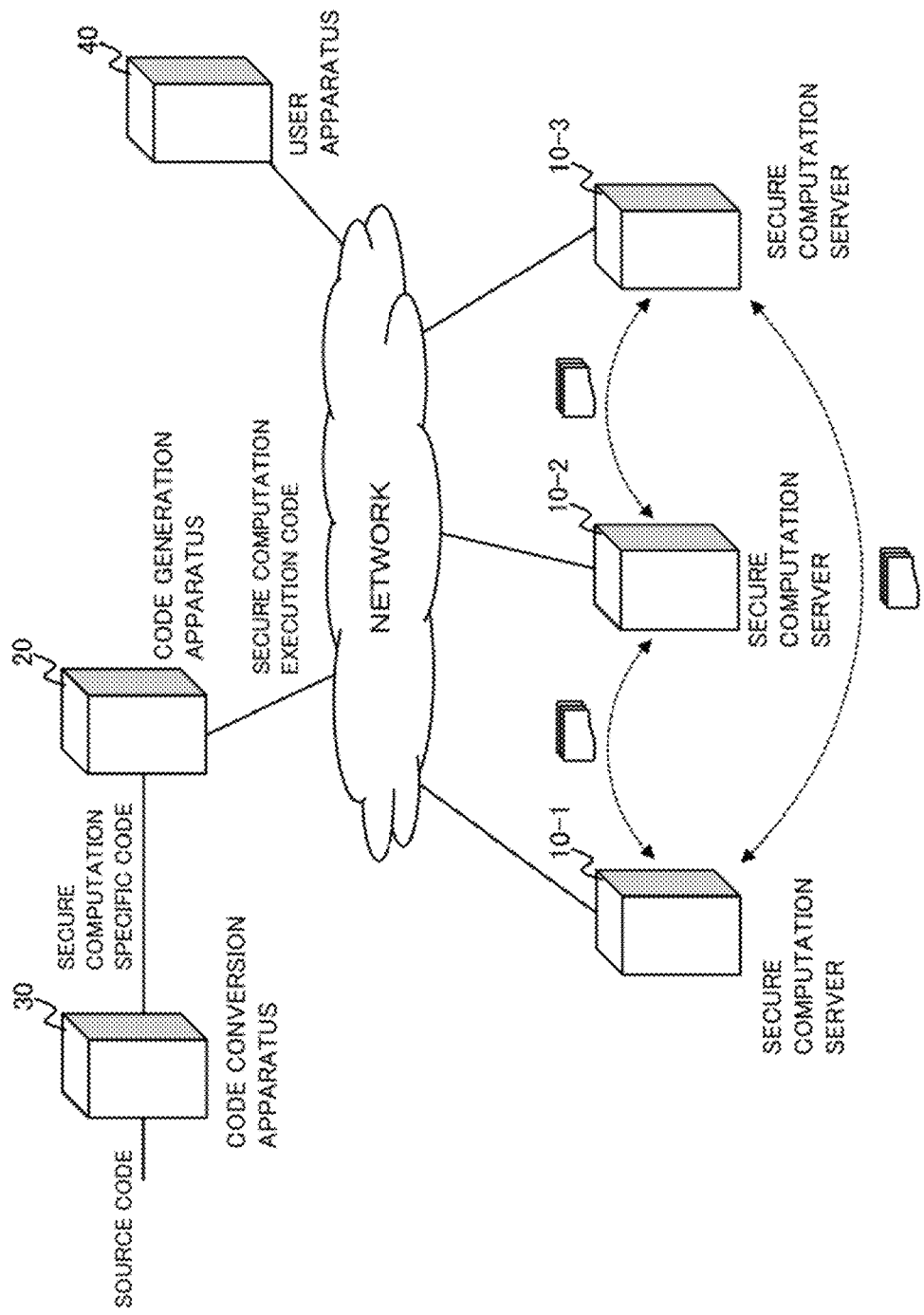
FIG. 2 is a diagram showing an example of outline configuration a secure computation system of a first exemplary embodiment.

FIG. 2 is a diagram showing an example of an outline configuration of a secure computation system of the first exemplary embodiment. As illustrated in FIG. 2, the secure computation system comprises a plurality of secure computation servers 10-1 to 10-3, a code generation apparatus 20, a code conversion apparatus 30 and a user apparatus 40.

Each apparatus illustrated in FIG. 2 is mutually connected and configured so that it may perform data transmission/reception. In the explanation below, in a case where no special reasons for discriminating the secure computation servers 10-1 to 10-3, they are simply referred to as "secure computation server(s)". In addition, the system configuration illustrated in FIG. 2 is an exemplification, thus it is of course not intended to limit the number of the secure computation servers 10 and the like.

The secure computation server 10 is a server that executes secure computation. The secure computation server 10 receives input data (data to be subjected to secret sharing) from the user apparatus 40. Each secure computation server 10 cooperates with the other servers to execute a predetermined process using the input data. The secure computation server 10 transmits a computation result to the user apparatus 40. Or, the secure computation server 10 may transmit the computation result to an external apparatus different from the user apparatus 40.

The code generation apparatus 20 is an apparatus that generates a secure computation execution code distributed to the secure computation servers 10. For example, a secure computation compiler disclosed in Non-Patent Literature 1 is installed in the code generation apparatus 20.

The code conversion apparatus 30 is an apparatus that obtains a source code by user operation and converts the obtained source code to a secure computation specific code that may be processed (received) by the code generation apparatus 20. Herein, the code conversion apparatus 30 obtains the source code via, for example, a network.

Next, each apparatus included in the secure computation system will be explained.

[Secure Computation Server]

Figure 3:
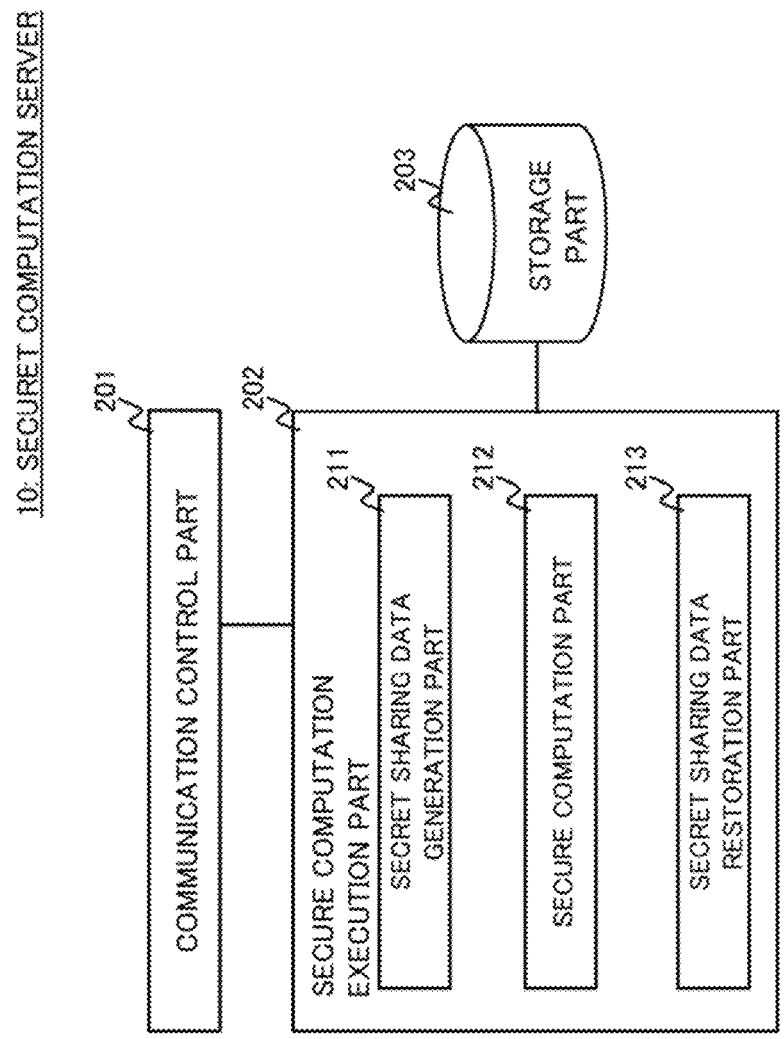
FIG. 3 is a diagram showing an example of a processing configuration of a secure computation server of the first exemplary embodiment.

FIG. 3 is a diagram showing an example of processing configuration (processing modules) of the secure computation server 10 of the first exemplary embodiment. As illustrated in FIG. 3, the secure computation server 10 is configured to comprise a communication control part 201, a secure computation execution part 202 and a storage part 203.

The communication control part 201 is a means configured to control communication with the other apparatuses. The communication control part 201 transfers the secure computation execution code obtained from the code generation apparatus 20 and the input data obtained from the user apparatus 40 to the secure computation execution part 202. The communication control part 201 transmits an execution result of secure computation by the secure computation execution part 202 to the other apparatuses (for example, the user apparatus 40).

The secure computation execution part 202 executes secure computation. The secure computation execution part 202 stores data (the secure computation execution code, the input data, etc.) obtained via the communication control part 201 in the storage part 203.

The storage part 203 stores various information in addition to the above described data. Concretely, the storage part 203 stores information defining order what "party" number own apparatus should execute operation and information about the other secure computation servers (the other parties), (for example, IP (Internet protocol) address and the like).

The secure computation execution part 202 executes secure computation using the information stored in the storage part 203. The secure computation execution part 202 comprises submodules comprising a secret sharing data generation part 211, a secure computation part 212 and a secret sharing data restoration part 213.

The secret sharing data generation part 211 is a module that executes an operation in a case where the secret sharing execution code includes a description (instruction) denoting that "own apparatus subjects the input data to secret sharing and distributes a result to the other servers". A secret sharing data generation part 211 of a secure computation server 10 whose party number (identifier) is identical with a party number designated in the secret sharing execution code subjects the obtained input data to secret sharing and distributes confidential information (share information) to the other secure computation servers 10.

A secure computation part 212 executes the secure computation execution code. In the Multi Party Computation using secret sharing, addition (subtraction) of the share information is computed in a closed state (locally computed) in own apparatus. On the other hand, multiplication (division) of the share information is computed in a manner where a computation result by own apparatus is transmitted to the other secure computation servers 10 and processed therein.

The secret sharing data restoration part 213 is a module that executes an operation in a case where the secret sharing execution code includes a description denoting that "own apparatus decodes the computation results". The secret sharing data restoration part 213 of a secure computation server 10 whose own apparatus party number is identical with a party number designated in the secret sharing execution code collects the computation results which have been distributed to each server and restores them.

[Code Generation Apparatus]

Figure 4:
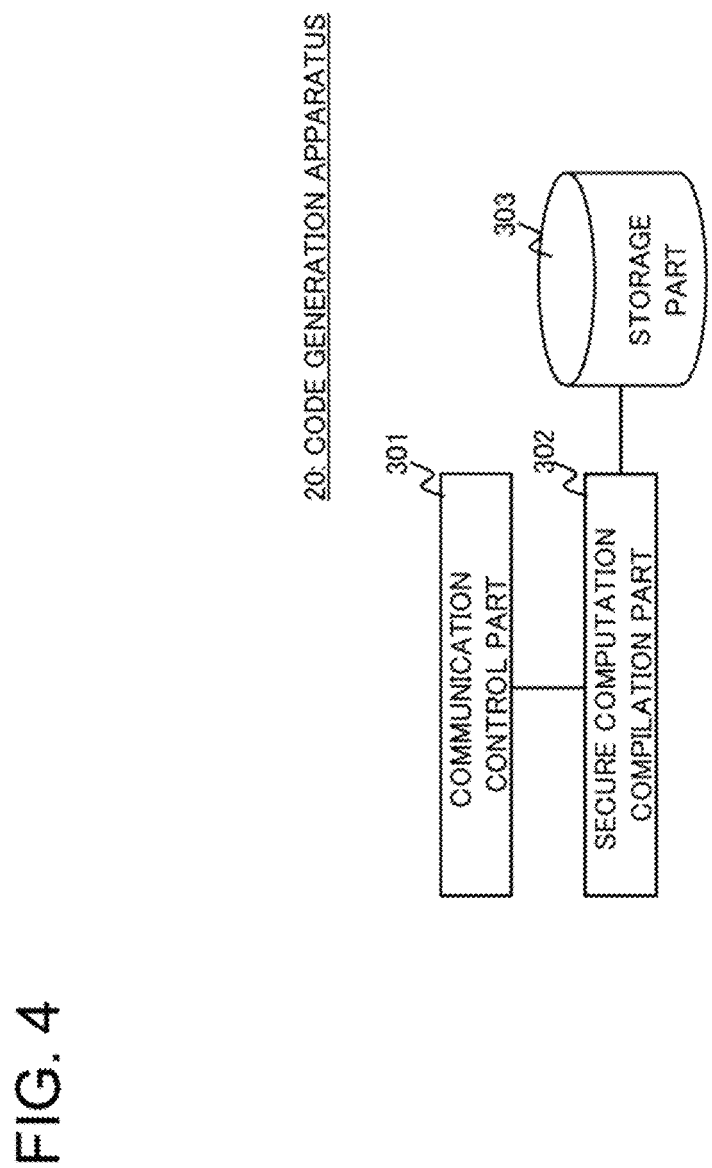
FIG. 4 is a diagram showing an example of a processing configuration of a code generation apparatus of the first exemplary embodiment.

FIG. 4 is a diagram showing an example of a processing configuration (processing modules) of the code generation apparatus 20 of the first exemplary embodiment. As illustrated in FIG. 4, the code generation apparatus 20 is configured to comprise a communication control part 301, a secure computation compilation part 302, and a storage part 303.

The communication control part 301 is a means configured to control communication with the other apparatuses. The communication control part 301 transfers the secure computation specific code obtained from the code conversion apparatus 30 to the secure computation compilation part 302.

The secure computation compilation part 302 is realized by, for example, a program disclosed in Non-Patent Literature 1. The secure computation compilation part 302 makes reference to a setting file and the like stored in the storage part 303 to execute a compilation process of the secure computation specific code. The secret computation compilation part 302 distributes a secure computation execution code generated by the compilation process to each secure computation server 10.

Herein, as described above, although the secure computation compilation part 302 may be realized by a program disclosed in Non-Patent Literature 1 and thus detail explanation thereof is omitted, it executes the following processes in brief.

In secure computation, it is required to communicate with the other secure computation servers 10 for completing multiplication. The communication with the other secure computation servers 10 may be a factor of reduction in secure computation speed. The secure computation compilation part 302 generates the secure computation execution code so that the number of communications may be reduced as much as possible. Concretely, the secure computation compilation part 302 executes a process, such as changing the order of multiplications described in the secure computation specific code so that the number of communications required for multiplication between the servers is reduced, and the like.

Herein, for example, in a case where the secure computation specific code is basically described in C language, the secure computation compilation part 302 acts as a C language compiler while executing a process relating to multiplication. The secure computation compilation part 302 similarly executes a process relating to multiplication (code generation) for the other language, while executing compilation for the language used in the secure computation specific code. Herein, a system manager may previously input a language for the secure computation specific code into the code generation apparatus 20 so that the secure computation compilation part 302 may automatically determine the used language.

[Code Conversion Apparatus]

Figure 5:
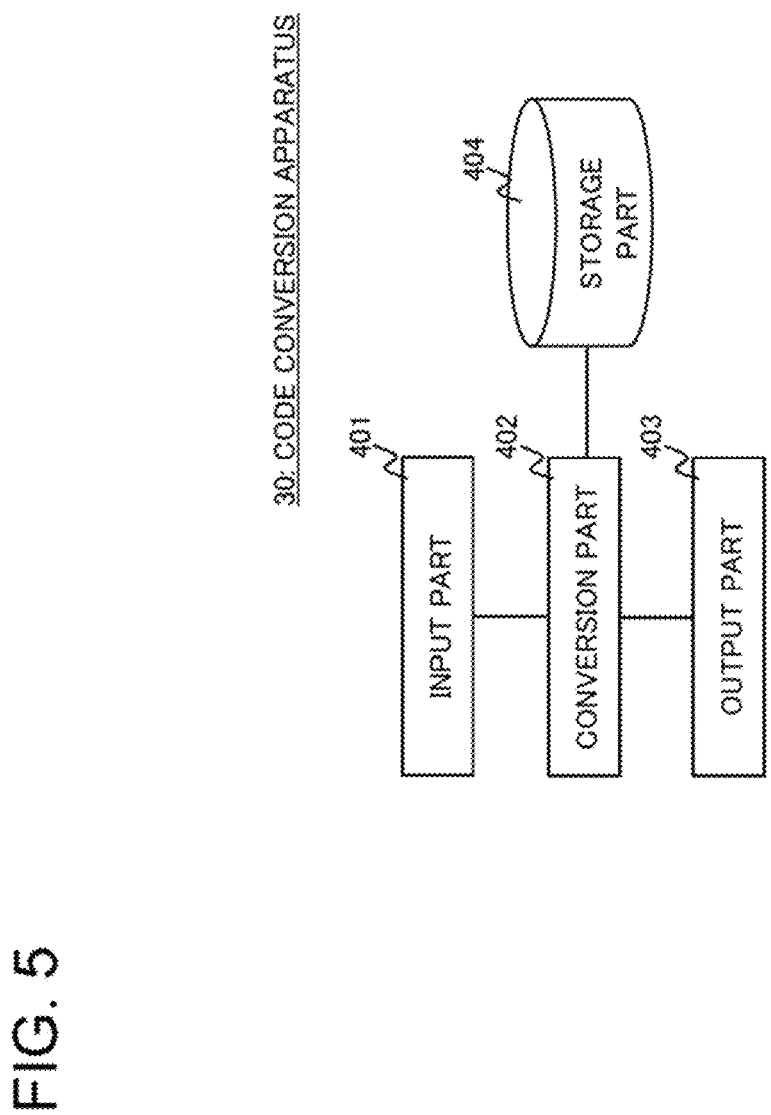
FIG. 5 is a diagram showing an example of a processing configuration of a code conversion apparatus of the first exemplary embodiment.

FIG. 5 is a diagram showing an example of a processing configuration (processing modules) of the code conversion apparatus 30 of the first exemplary embodiment. As illustrated in FIG. 5, the code conversion apparatus 30 is configured to comprise an input part 401, a conversion part 402, an output part 403 and a storage part 404.

The input part 401 is a means configured to input the source code. The input part 401 obtains the source code by user operation. Or, the input part 401 may obtain the source code via a network.

The conversion part 402 is a means configured to convert the input source code so that a secure computation compiler may process it based on setting information relating to secure computation executed by the plurality of secure computation servers 10. The conversion part 402 converts the source code input by a user to the secure computation execution code. Detail operation by the conversion part 402 is described later on.

The output part 403 is a means configured to output the generated secure computation execution code to the code generation apparatus 20.

The storage part 404 stores, for example, a setting information and like required for conversion process by the conversion part 402. Concrete contents of the setting information stored in the storage part 404 is described later on together with the operation by the conversion part 402.

Next, operation by the conversion part is explained while referring to drawings.

The conversion part 402 obtains the source code via the input part 401. Herein, it is assumed that conversion part 402 obtained the source code shown in FIG. 6. The source code shown in FIG. 6 is described in Python. Herein, it is, of course, not intended to limit the language to Python. The code conversion apparatus 30 may handle source codes described in arbitrary languages, such as C language, Basic, assembler, etc.

The source code multiplies the input data obtained from an external section by 10 and realizes an average value computation of the input data multiplied by 10. The program shown in FIG. 6 includes a main function ("main") and a subfunction ("function") and computes the average value.

The conversion part 402 converts the source code shown in FIG. 6 to generate a "secure computation specific code" to be provided to the code generation apparatus 20. At that time, the conversion part 402 makes reference to setting information stored in the storage part 404.

FIGS. 7A to 7E are a diagram showing an example of setting information referenced by the conversion part 402, respectively. The setting information includes information about the secure computation servers 10 and various regulations (rules) for determining conversion operation of by the conversion part 402. The setting information includes, for example, regulations for a conversion process of the input function and the output function and regulations for conversion process relating to parameters and types.

FIG. 7A shows an example of information about the secure computation servers 10 [referred to as "secure computation server setting"]. Setting for "data input mode" and "data restoration subject" are described in FIG. 7A as information about the secure computation servers 10.

The data input mode is a setting defining how data is obtained, which is required upon executing secure computation by the secure computation servers 10.

The setting may include a mode where, as indicated in FIG. 7A, a server defined as a representative server among the plurality of secure computation servers 10 receives the input data and the [representative] server subjects the input data to secret sharing and distributes [a result] to the other secure computation servers 10. In one example of FIG. 2 and FIG. 7A, the secure computation server 10-1 as the representative server obtains data from the user apparatus 40. The secure computation server 10-1 subjects the obtained input data to secret sharing and distributes [a result] to the other secure computation servers 10-2, 10-3.

As another setting for the data input mode, there is a mode where an external apparatus subjects data to secret sharing and the external apparatus distributes data subjected to secret sharing to the secure computation servers 10 (shared by the external apparatus). For example, in the example of FIG. 2, the user apparatus 40 subjects data to secret sharing and distributes the [resultant] data to the three secure computation servers 10.

A setting about the data restoration subject defines a subject (server) that restores the results obtained by secure computation. For example, in the example of FIG. 7A, the secure computation server 10-1 as the representative server collects secret computation results from the other secure computation servers 10-2, 10-3 and executes restoration of a computation result held by itself and the collected computation results. In the example of FIG. 6, since an average value of input data after 10 times multiplication has been distributed to each secure computation server 10, the secure computation server 10-1 as the representative server restores the average value.

As another setting for the data restoration subject, there is a mode where an external apparatus restores the data (restoration by the external apparatus). For example, in the example of FIG. 2, the user apparatus 40 may collect computation results from each secure computation server 10 and restore the secure computation results.

FIG. 7B is a diagram showing an example of a rule for conversion process of the input function [referred to as "input function setting"]. The conversion part 402 converts an input function designated by the rule to a function suitable for secure computation.

In the example of FIG. 7B, in a case where the source code includes "get_input", the conversion part 402 rewrites [sic, replaces] the input function to[by] "get_input from ( )". Herein, an identifier of the representative server that obtains the input data is set in the parentheses subsequent to "from" in the above function [i.e., "get_input from ( )"]. In addition, in a case where an external apparatus subjects the date to secret sharing and distributes the data subjected to secret sharing to each secure computation server 10, the conversion part 402 rewrites "get_input" to "get_input (external)" and the like.

FIG. 7C is a diagram showing an example of a rule for conversion process of the output function [referred to as "output function setting"]. The conversion part 402 converts the output function designated by the regulation to a function suitable for secure computation.

In the example of FIG. 7 C, in a case where "print_ln" is included in the source code, the conversion part 402 adds "reveal 0" to a parameter (argument) [i.e., "(–, result)"] in the output function [i.e., "print_ln(–, result)"]. Herein, an identifier of a representative server that restores the computation results is set in the parentheses subsequent to "reveal".

FIG. 7D is a diagram showing an example of setting for conversion process of a parameter [referred to as "parameter setting"]. The conversion part 402 keeps the input data obtained from an external apparatus (the user apparatus 40) in secret. The conversion part 402 determines whether or not a parameter, a constant value, etc., other than the input data are subjected to secret sharing based on this setting. For example, as the setting for conversion process of the parameter, a setting value, such as "minimum" or "maximum" and the like, may be set.

In a case where the setting is "minimum", the input data to be subjected to secret sharing and parameters receiving an effect from [i.e., affected by] the input data are targets for secret sharing [referred to as "secret sharing target(s)". In a case where the setting is "maximum", all of parameters and the constant value included in the source code will be the secret sharing targets. Herein, concrete examples of the setting (minimum, maximum) are described later on together with an operation by the conversion part 402.

FIG. 7E is a diagram showing an example of a setting for conversion process of type [referred to as "type setting"]. In a case where type of the parameters is clearly described (identified) in the source code, the conversion part 402 converts the parameters to secure computation parameters of a type corresponding to the clearly described type.

However, there are also languages which do not include clear indication of the type. In such case, the conversion part 402 makes reference to the setting for conversion process of type and uses a type for a secure computation depending on the setting. In the example of FIG. 7E, the conversion part 402 converts the parameters whose type is not clearly described to secure computation parameters of an integer type.

In addition, the setting for conversion process of type also includes settings whether a division result is described in fixed point or floating point. In the example of FIG. 7E, it is defined that the division result of a parameter subjected to secret sharing is described in fixed point.

Next, the conversion process using the setting information by the conversion part 402 is concretely explained while referring to the source code shown in FIG. 6. First, the conversion part 402 detects (extracts), from the source code, a function designated by the input function setting in the setting information.

In the example of FIGS. 7A to 7E, the conversion part 402 attempts to detect "get_input". The conversion part 402 detects this function at 5th line in the source code shown in FIG. 6. The conversion part 402 makes reference to the secure computation server setting in the setting information and confirms a setting value of "data input mode".

In FIGS. 7A to 7E, secret sharing by the representative server (the secure computation server 10-1) is set, thus the conversion part 402 sets an identifier of the secure computation server 10-1 (for example, "1") in parenthesis subsequent to "from" in "get_input from ( )" shown in FIG. 7B. As a result, as indicated at 5th line in FIG. 8, the "get_input" is converted to "sint.get_input from (1)".

Herein, the type of "get_input" is not described clearly, thus the conversion part 402 sets "sint" indicating the integer type for secure computation in the function based on the setting in FIG. 7E.

As described above, the conversion part 402 replaces a predetermined input function that is included in both of the setting information and the source code by an input function for secret computation. At that time, the conversion part 402 sets information about a secure computation server (the representative server) that obtains data to be subjected to secret sharing among the plurality of secure computation servers in the input function for secure computation, as necessary.

Herein, the conversion part 402 determines a parameter to be a storing destination of data obtained based on the input function (function for obtaining data from an external apparatus) [referred to as "storing destination parameter(s)"] as one of the secret sharing targets. In the example of FIG. 6, the [storing destination parameter] "input_values" described in 3rd line and 5th line are the parameters to be the secret sharing targets [referred to as "secret sharing target parameter(s)"].

Next, the conversion part 402 makes reference to the setting for secret sharing of parameters [i.e., the parameter setting] in the setting information.

In the example of FIG. 7D, since "minimum" is set as this setting, the conversion part 402 determines, as the secret sharing targets, the secret sharing target parameters defined by the input function and parameters affected by the these parameters.

In the example of FIG. 6, "input_values" is the secret sharing target parameter. In addition, in 7th line in FIG. 6, this parameter is used as a first parameter of a function "mean". The first parameter (value) of this function is multiplied by 10 at 14th line and added to a parameter "sum". Therefore, the parameter "sum" also receives an effect from the secret sharing (target) parameter, thus is the secret sharing target.

In addition, since, at 15th line, the parameter "sum" is divided by a second parameter (num) of the function "mean", thus a parameter "mean" also receives an effect (indirectly affected) from the secret sharing (target) parameter. Therefore, the parameter "mean" is also the secret sharing target.

In summary, in the example of FIG. 6, each of the parameters "input_values", "sum" and "mean" are the secret sharing targets.

The conversion part 402 confirms "setting for conversion process of type [i.e., type setting]" in the setting information and determines the type of parameters to be the secret sharing targets so as to reflect it to the source code.

In the example of FIG. 7E it is defined to convert it to "integer type for secure computation" if the type is not clearly described. Since the type of the parameter "input_values" is not clearly described, the conversion part 402 handles the type of the parameter as the integer type. Concretely, as described in 3rd line in FIG. 8, the conversion part 402 converts the type of function "Array" to "sint" indicating the integer type for secure computation (handled as the integer type for secret sharing by the secure computation compiler).

The type of the parameter "sum" is clearly described as the integer type as indicated in 12th line in FIG. 6, thus, with respect to this parameter, the conversion part 402 sets "sint" indicating that it is the secret sharing target while maintaining the pre-converted integer type. Concretely, the type of the parameter "sum" is set as "sint" as indicated in 12th line in FIG. 8. Herein, "0" is set as an initial value of this parameter in the 12th line in FIG. 8.

With respect to type of the parameter "mean", the conversion part 402 focuses on a point that a division result of the secret sharing target parameter "sum" by a constant value (num, num_input) is stored in this parameter.

Since it is division, the conversion part 402 makes reference to the setting (type upon division) shown in FIG. 7E and converts the parameter "mean" to that of a fixed point type for secure computation. Concretely, the conversion part 402 adds processes of 16th line to 19th line in FIG. 8.

In further detail, the conversion part 402 defines new parameters corresponding to the parameters to be targets for division (sum, num) as parameters of the fixed point type. Concretely, defined are a parameter "Sf" of the fixed point type corresponding to the parameter "sum" and a parameter "Nf" of the fixed point type corresponding the constant value "num" (16th line and 18th line in FIG. 8).

The conversion part 402 converts the types of the parameters "sum", "num" from the integer type to the fixed point type and loads these values to new parameters "Sf", "Nf" (17th line and 19th line in FIG. 8). Since the parameters "sum", "num" has been replaced by the new parameters, the conversion part 402 replaces the division using these parameters by [a division] that uses the new parameters "Sf", "Nf" (20th line in FIG. 8).

As described above, the conversion part 402 sets the first parameter ("input_values" in the above example) to be a storing destination of data obtained by a predetermined input function as the secret sharing target and converts the source code so that the first parameter is subjected to secret sharing. Further, the conversion part 402 sets the second parameters affected by the first parameter ("sum" and the like in the above example) as the secret sharing targets, and converts the source code so that the second parameters are subjected to secret sharing.

Then, the conversion part 402 detects (extracts) a function designated by the output function setting in the setting information from the source code.

In the example of FIG. 7C, the conversion part 402 attempts to detect "print_ln". As a result, the conversion part 402 detects this function at 8th line in the source code shown in FIG. 6. The conversion part 402 makes reference to the secure computation server setting in the setting information so as to confirm the setting value for the "data restoration subject".

In the example of FIG. 7A, it is defined that a representative server (secure computation server 10-1) restores process results. Therefore, the conversion part 402 sets an identifier of the secure computation server 10-1 (for example, "1") in the parentheses of "print_ln (-, result.reveal( )" shown in FIG. 7C. As a result, as described in 8th line in FIG. 8, "print_ln('mean=% s'¥n,result)" is converted to "print_ln('mean=% s'¥n,result.reveal(1)).

As described above, the conversion part 402 replaces a predetermined output function that is included in both of the setting information and the source code by an output function for secure computation. At that time, the conversion part 402 sets information for a secure computation server (the representative server) that decodes results of secure computation executed by the plurality of secure computation servers 10 in the output function for secure computation.

Next, explained is an operation by the conversion part 402 in a case where "maximum" is set as a setting for conversion process of the parameter [i.e., parameter setting] indicated in FIG. 7D.

In a case where this setting is "maximum", the conversion part 402 subjects all parameters, constant values included in the source code to secret sharing. In the example of FIG. 6, "num_input" described in 2nd line and the constant value "10" described in 14th line are also subjected to secret sharing.

In the source code in FIG. 6, in a case where the setting for conversion process of the parameter [i.e., parameter setting] is "maximum", the conversion part 402, for example, generates a secure computation specific code shown in FIG. 9. Differences between the secure computation specific codes shown in FIG. 8 and FIG. 9 are points that [the type of the parameter] "num_input" is defined as the integer type for secret sharing and "1000" is set as a value thereof at 2nd line in FIG. 9. Further, the two secure computation specific codes have differences in a point that integer type parameter "p1" for secret sharing is added at 13th line in FIG. 9 and a point that the constant value "10" is replaced by the parameter "p1" at 15th line.

As stated above, in a case where "maximum" is set as the setting for conversion process of parameter [i.e., parameter setting], the conversion part 402 subjects the other parameters and the constant values described in the source code to secret sharing in addition to the parameter obtained from the external section and the parameters receiving an effect therefrom.

By virtue of the secret sharing, leakage of information included in the source code may be strongly prevented. For example, in a case where user's knowledge (know-how) is accumulated in the constant value "10" described at 14th line in FIG. 6, it is preferable that the constant value is also kept in secret. The code conversion apparatus 30 of the first exemplary embodiment may create a secure computation specific code that satisfies such demand.

[User Apparatus]

The user apparatus 40 is an apparatus that provides the input data that is subjected to secure computation by the secure computation servers 10. The user apparatus 40 may obtain secure computation results computed by the secure computation servers 10. Configuration of the user apparatus 40 and an operation thereby are apparent for a person skilled in the art, thus detail explanation therefor is omitted.

[Hardware Configuration]

Next, a hardware configuration of each apparatus configuring the secure computation system is explained.

Figure 10:
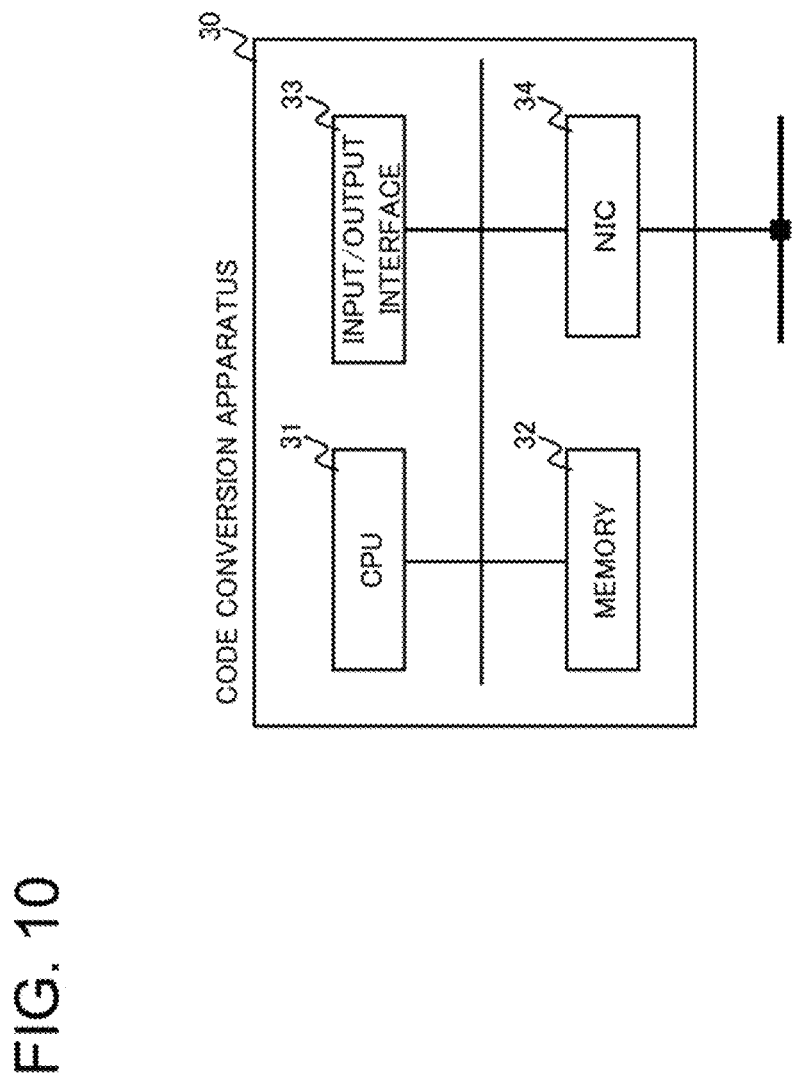
FIG. 10 is a diagram showing an example of a hardware configuration of the code conversion apparatus of the first exemplary embodiment.

FIG. 10 is a diagram showing an example of a hardware configuration of the code conversion apparatus 30. The code conversion apparatus 30 is realized by, so called, an information processing apparatus (computer) and comprises a configuration exemplified in FIG. 10. For example, the code conversion apparatus 30 comprises a CPU (Central Processing Unit) 31, a memory 32, an input/output interface 33, a NIC (Network Interface Card) 34 as a communication means and the like, which are mutually connected with an inner bus.

Provided that, it is not intended to limit the hardware configuration of the code conversion apparatus 30 to the configuration illustrated in FIG. 10. The code conversion apparatus 30 may comprise hardware, not shown. It is also not intended to limit the number of CPU and the like mounted on the code conversion apparatus 30 to the exemplification of FIG. 10, thus, for example, a plurality of CPUs 31 may be included in the code conversion apparatus 30.

The memory 32 comprises RAM (Random Access Memory), ROM (Read Only Memory), an auxiliary storage apparatus (hard disk and the like) and the like.

The input/output interface 33 is an interface for an input/output apparatus, not shown. The input/output apparatus comprises, for example, a display apparatus, an operation device and the like. The display apparatus comprises, for example, a liquid crystal display and the like. The operation device comprises for example, a keyboard, a mouse and the like.

Functions of the code conversion apparatus 30 may be realized by the above described processing modules. The processing modules are realized by, for example, CPU 31 executes a program stored in the memory 32. In addition, the program may be downloaded via a network or updated using a storage medium that stores the program. Further, the processing modules may be realized by a semiconductor chip. That is, functions executed by the processing modules may be realized by any hardware or software executed by using hardware.

Herein, the code generation apparatus 20, the secure computation server 10 and the user apparatus 40 may be also realized by information processing apparatuses (computers), and hardware configurations thereof are apparent for a person skilled in the art, thus detail explanations thereof are omitted.

[Operation by the System]

Figure 11:
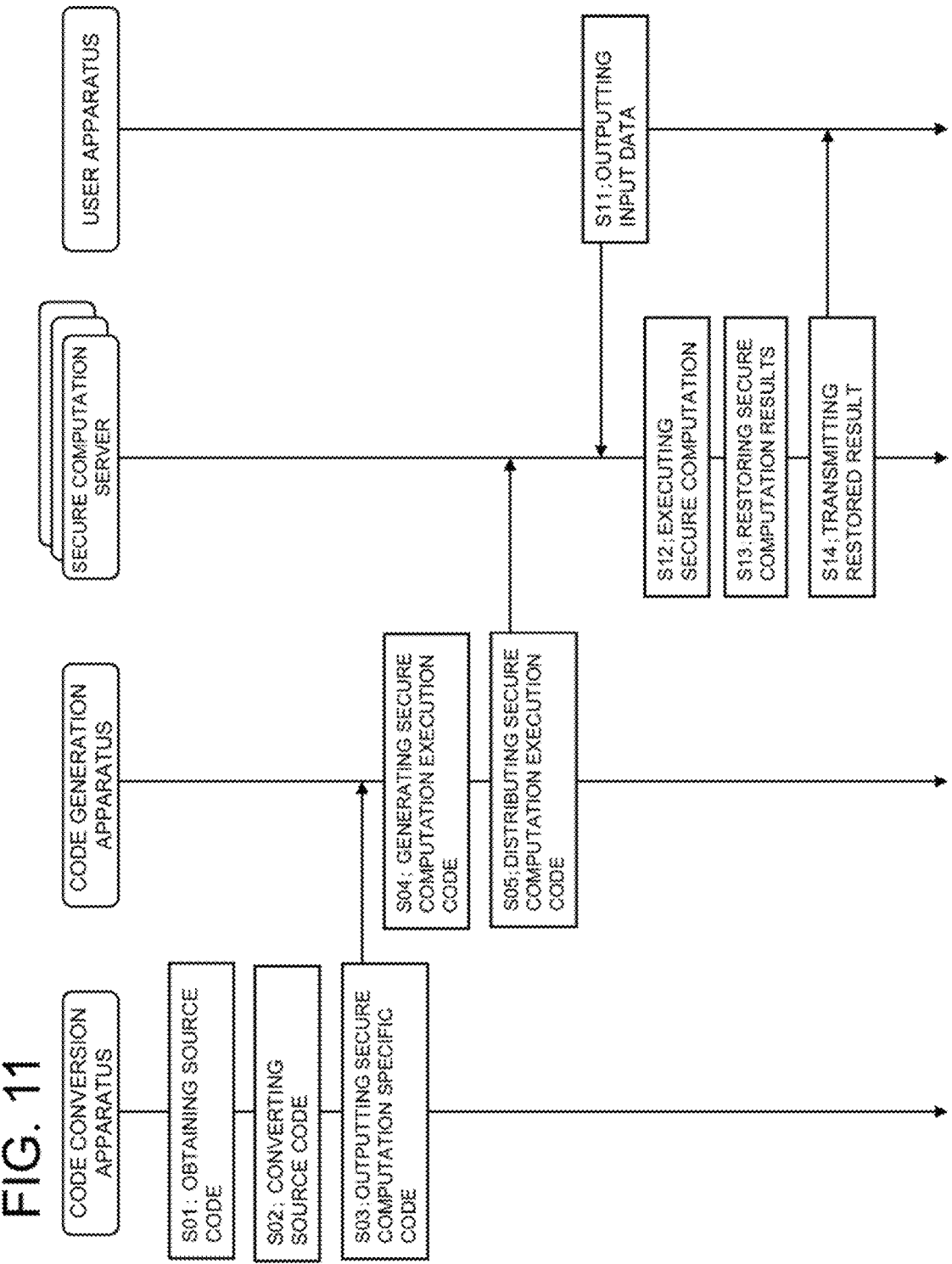
FIG. 11 is a sequence diagram showing an example of operation by the secure computation system of the first exemplary embodiment.

FIG. 11 is a sequence diagram showing an example of operation by the secure computation system of the first exemplary embodiment.

First, the code conversion apparatus 30 obtains the source code from a user (step S01).

Then, the code conversion apparatus 30 converts the obtained source code to the secure computation specific code while referring to the setting information (step S02).

The code conversion apparatus 30 outputs the secure computation specific code to the code generation apparatus 20 (step S03).

The code generation apparatus 20 compiles the secure computation specific code using the secure computation compiler to generate the secure computation execution code (step S04).

The code generation apparatus 20 distributes the generated secure computation execution code to each secure computation server 10 (step S05).

By virtue of the above processes, each secure computation server 10 completes preparation for executing secure computation. Then, the user apparatus 40 outputs the input data to the secure computation servers 10 (step S11). For example, the user apparatus 40 outputs the input data to a secure computation server 10 set as the representative server.

Herein, information indicating which secure computation server 10 acts as the representative server is shared by each apparatus consisting the secure computation system.

Each secure computation server 10 executes secure computation using the secure computation execution code and the input data (step S12).

The secure computation server 10 set as the representative server restores secure computation results (step S13).

The secure computation server 10 transmits the restored result to the ser apparatus 40 (step S14).

Accordingly, the code conversion apparatus 30 of the first exemplary embodiment converts the input source code so that a secure computation compiler may process it based on setting information for secure computation executed by the plurality of secret computation servers 10. As a result, even a user who does not have expert's knowledge for secure computation may easily construct the secure computation execution environment.

Second Exemplary Embodiment

Next, a second exemplary embodiment is explained in detail while referring to drawings.

In the first exemplary embodiment, explained are cases where "minimum" and "maximum" are applied to the setting value for secret sharing of parameter [i.e., parameter setting]. In the second exemplary embodiment, the other setting for secret sharing of parameter is explained.

In a case where the source code has a small scale, the number of the parameter and constant value to be targets is small even in a case of "maximum" setting, thus a severe problem would not occur. However, along enlarging the scale of the source code, problems would occur in secure computation efficiency (execution speed and the like) using the secure computation execution code generated by code conversion.

Herein, explained in the second exemplary embodiment is the code conversion apparatus 30 in which a user may select parameter, constant value(s) and the like that are to be the secure computation targets.

For example, the input part 401 may obtain, together with the source code, a list indicating whether or not the parameters and constant value(s) included in the source code should be kept in secret. The conversion part 402 of the code conversion apparatus 30 may determine whether or not the parameters and constant value(s) are subjected to secret sharing based on the list. In the example of the source code shown in FIG. 6, the conversion part 402 may determine whether it is necessary or not to subject the parameter(s) and the like to secret sharing based on the list shown in FIG. 12.

As described above, the code conversion apparatus 30 of the second exemplary embodiment may input the list designating the parameters and constant value(s) as the secret sharing targets and convert the source code so that the parameters and constant value(s) designated by the list are subjected to secret sharing.

Figure 13:
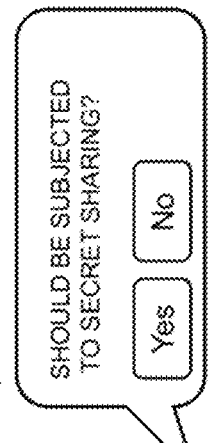
FIG. 13 is an explanatory view of operation by the code conversion apparatus of the second exemplary embodiment.

Or, the code conversion apparatus 30 may provide GUI (Graphical User Interface) for inputting by an user whether it is necessary or not to subject parameter(s) and the like included in the source code to secret sharing while displaying the obtained source code on a liquid crystal display and the like (see FIG. 13). As stated above, the code conversion apparatus 30 may convert the source code so that the parameters and constant value(s) designated by the user using GUI are subjected to secret sharing.

Accordingly, in the second exemplary embodiment, parameter(s) and the like to be subjected to secret sharing may be determined based on user's setting and operation, thus only information which a user truly wishes to keep in secret may be hidden. As a result, parameters to be subjected to secret sharing are limited, thus required efficiency for secure computation may be ensured.

Variational Examples

Herein, the construction and operation of the secure computation system explained in the first and second exemplary embodiments are exemplifications, thus they may be variously modified. For example, functions of the code generation apparatus 20 and functions of the code conversion apparatus 30 illustrated in FIG. 2 may be realized by the same apparatus. That is, a "code conversion function" may be included in the code generation apparatus 20 and a "code generation function" may be included in the code conversion apparatus 30.

Alternatively, at least either one of the code conversion function or the code generation function may be included in the user apparatus 40.

In the example of FIG. 2, one user apparatus 40 is illustrated and the user apparatus 40 supplies the secure computation servers 10 with data for secure computation. However, a plurality of user apparatus may supply the secure computation servers 10 with data for secure computation.

In the above exemplary embodiments, explained are examples where the storage part 404 for storing the setting information is installed in the code conversion apparatus 30. However, the setting information referred to upon code conversion operation may be stored in a database server and the like on a network. In this case, a user may define conversion operation by the code conversion apparatus 30 if the setting information includes setting for parameter as the secure sharing targets (parameter list) and the setting may be edited by the user.

In the above exemplary embodiments, explained are cases where information for the representative server (party number) is clearly described in the input function and output function for secure computation in the setting information. However, such setting may be omitted. In such case, the code conversion apparatus 30 may set a predetermined secure computation server 10 as the representative server.

In the second exemplary embodiment, explained are a case where parameters and the like to be subjected to secret sharing are designated by a list and a case where the parameters are designated using GUI. These parameter designation methods are not in an exclusive relationship, thus they may be used at the same time. For example, the code conversion apparatus 30 may display contents (necessity of secret sharing for each parameter) designated by the list in an overlap manner on the source code and the user may change a parameter to be subjected to secret sharing and a parameter not to be subjected to secret sharing while confirming the display.

In the exemplary embodiments, explained is a case where the output result by the code conversion apparatus 30 is immediately utilized by the code generation apparatus 20. However, an expert for secure computation may confirm the output result by the code conversion apparatus 30 and add appropriate corrections to it. Further, the relationship between the secure computation specific code before correction and the secure computation specific code after correction by the expert may be accumulated and the accumulated information may be input to a learning apparatus, such as AI (Artificial Intelligence) and the like, so as to construct a learning model. In addition, the secure computation system may comprise an apparatus that corrects the secure computation specific code output by the code conversion apparatus 30 using the learning model.

Further, the computer program described above may be installed in a storage part of a computer so that the computer functions as the code conversion apparatus 30. Furthermore, the computer may execute the computer program described above so that the computer executes the code conversion method.

Disclosure of each of the cited Patent Literature, etc. is incorporated herein by reference thereto. Modifications and adjustments of the exemplary embodiments and examples are possible within the ambit of the disclosure (including the claims) of the present invention and based on basic technical concept therein. Various combinations and selections (including non-selections) of various disclosed elements (including the elements in the claims, exemplary embodiments, examples, drawings, etc.) are possible within the ambit of the disclosure of the present invention. Namely, the present invention of course includes various variations and modifications that could be made by those skilled in the art according to the overall disclosure including the claims and the technical concept. Particularly, with respect to the numerical value ranges disclosed in the present application should be interpreted to concretely disclose an arbitrary numerical value or a small range within the range, even in a case where explicit disclosure is absent.

REFERENCE SIGNS LIST

10, 10-1 to 10-3 secure computation server
20 code generation apparatus
30 code conversion apparatus
31 CPU (Central Processing Unit)
32 memory
33 input/output interface
34 NIC (Network Interface Card)
40 user apparatus
100 conversion apparatus
101, 401 input part
102, 402 conversion part
201, 301 communication control part
202 secure computation execution part
211 secret sharing data generation part
212 secure computation part
213 secret sharing data restoration part
203, 302[sic, 303], 404 storage part
302 secure computation compilation part
403 output part

What is claimed is:

1. A conversion apparatus, comprising:
a processor; and
a memory for storing program instructions to be executed by the processor,
the program instructions being configured to implement:
an input part for inputting a source code, and
a conversion part that converts the source code so that a secure computation compiler processes the source code based on setting information relating to secure computation executed by a plurality of secure computation servers, wherein
the conversion part replaces a predetermined input function included in the source code by an input function for the secure computation, and
the conversion part sets a first parameter to be a storing destination of data obtained with the predetermined input function as a target of secret sharing, and converts the source code so that the first parameter is subjected to the secret sharing.

2. The conversion apparatus according to claim 1, wherein
the conversion apparatus is a cord conversion apparatus configured to be connectable with the plurality of secure computation servers via a cord generation apparatus and with a user via the Internet.

3. The conversion apparatus according to claim 2, wherein
the conversion part sets information for a given secure computation server of the plurality of secure computation servers that obtains the data to be subjected to the secret sharing among the plurality of secure computation servers in the input function for the secure computation.

4. The conversion apparatus according to claim 1, wherein
the conversion part sets a second parameter receiving an effect from the first parameter as the target for the secret sharing, and converts the source code so that the second parameter is subjected to the secret sharing.

5. The conversion apparatus according to claim 4, wherein
the conversion part sets a third parameter different from the first and second parameters and a constant value included in the source code as the target for the secret sharing, and converts the source code so that the third parameter and the constant value set as the target for the secret sharing is subjected to the secret sharing.

6. The conversion apparatus according to claim 1, wherein
the input part inputs a list designating a parameter and a constant to be the target for the secret sharing, and
the conversion part converts the parameter and the constant designated by the list so as to be subjected to the secret sharing.

7. The conversion apparatus according to claim 1, wherein
the conversion part converts the source code so that a parameter and a constant value designated by a user are subjected to the secret sharing.

8. The conversion apparatus according to claim 1, wherein
the conversion part replaces a predetermined output function included in the source code by an output function for the secure computation.

9. The conversion apparatus according claim 8, wherein
the conversion part sets information for a given secure computation server of the plurality of secure computation servers that decodes a result of the secure computation executed by the plurality of secure computation servers in the output function for the secure computation.

10. A conversion method comprising:
(a) inputting a source code;
(b) converting the source code so that a secure computation compiler processes the source code based on setting information relating to secure computation executed by a plurality of secure computation servers;
(c) replacing a predetermined input function included in the source code by an input function for secure computation; and
(d) setting a first parameter to be a storing destination of data obtained with the predetermined input function as a target of secret sharing, and converting the source code so that the first parameter is subjected to the secret sharing.

11. A non-transient computer-readable storage medium storing a program that causes a computer to execute processes comprising:
   (a) inputting a source code;
   (b) converting the source code so that a secure computation compiler processes the source code based on setting information relating to secure computation executed by a plurality of secure computation servers;
   (c) replacing a predetermined input function included in the source code by an input function for secure computation, and
   (d) setting a first parameter to be a storing destination of data obtained with the predetermined input function as a target of secret sharing, and converting the source code so that the first parameter is subjected to the secret sharing.

12. The conversion method according to claim 10, wherein
   (b) is executed by a cord conversion apparatus configured to be connectable with the plurality of secure computation servers via a cord generation apparatus and with a user via the Internet.

13. The conversion method according to claim 12, wherein
   (b) includes setting information for a given secure computation server of the plurality of secure computation servers that obtains the data to be subjected to secret sharing among the plurality of secure computation servers in the input function for the secure computation.

14. The conversion method according to claim 10, wherein
   (b) includes replacing a predetermined output function included in the source code by an output function for the secure computation.

15. The conversion method according claim 14, wherein
   (b) includes setting information for a given secure computation server of the plurality of secure computation servers that decodes a result of the secure computation executed by the plurality of secure computation servers in the output function for the secure computation.

16. The non-transient computer-readable storage medium storing a program according to claim 11, wherein
   (b) is executed by a cord conversion apparatus configured to be connectable with the plurality of secure computation servers via a cord generation apparatus and with a user via the Internet.

17. The non-transient computer-readable storage medium storing a program according to claim 16, wherein
   (b) includes setting information for a secure computation server that obtains the data to be subjected to the secret sharing among the plurality of secure computation servers in the input function for the secure computation.

18. The non-transient computer-readable storage medium storing a program according to claim 11, wherein
   (b) includes replacing a predetermined output function included in the source code by an output function for the secure computation.

19. The non-transient computer-readable storage medium storing a program according claim 18, wherein
   (b) includes setting information for a given secure computation server of the plurality of secure computation servers that decodes a result of the secure computation executed by the plurality of secure computation servers in the output function for the secure computation.

* * * * *